US011314371B2

(12) United States Patent
Jung et al.

(10) Patent No.: US 11,314,371 B2
(45) Date of Patent: Apr. 26, 2022

(54) METHOD AND APPARATUS FOR PROVIDING GRAPHIC USER INTERFACE

(71) Applicant: Samsung Electronics Co., Ltd., Suwon-si (KR)

(72) Inventors: Ho-Young Jung, Suwon-si (KR); Do-Hyeon Kim, Suwon-si (KR); Ji-Hoon Kim, Seoul (KR); Dong-Chang Lee, Suwon-si (KR); Dong-Hyuk Lee, Seoul (KR); Jae-Woong Lee, Bucheon-si (KR); Won-Suk Chang, Hwaseong-si (KR); Seong-Taek Hwang, Pyeongtaek-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 16/227,896

(22) Filed: Dec. 20, 2018

(65) Prior Publication Data

US 2019/0121496 A1 Apr. 25, 2019

Related U.S. Application Data

(63) Continuation of application No. 14/444,242, filed on Jul. 28, 2014, now Pat. No. 10,216,350.

(51) Int. Cl.
*G06F 3/0481* (2013.01)
*G06F 9/451* (2018.01)
(Continued)

(52) U.S. Cl.
CPC .......... *G06F 3/0481* (2013.01); *G06F 3/0488* (2013.01); *G06F 3/04883* (2013.01); *G06F 9/451* (2018.02); *G06F 9/445* (2013.01)

(58) Field of Classification Search
None
See application file for complete search history.

(56) References Cited

U.S. PATENT DOCUMENTS

| 6,018,710 A | 1/2000 | Wynblatt et al. |
| 6,275,611 B1 | 8/2001 | Parthasarathy |
(Continued)

FOREIGN PATENT DOCUMENTS

| CN | 101477432 A | 7/2009 |
| CN | 101872285 A | 10/2010 |
(Continued)

OTHER PUBLICATIONS

Indian Office Action dated Jun. 23, 2020, issued in Indian Application No. 3677/MUMNP/2015.
(Continued)

*Primary Examiner* — William L Bashore
*Assistant Examiner* — Nathan K Shrewsbury
(74) *Attorney, Agent, or Firm* — Jefferson IP Law, LLP

(57) ABSTRACT

A method of providing a Graphical User Interface (GUI) is provided. The method includes receiving an image to be used for the GUI, and selecting one or more object areas to be used for the GUI from the image, setting a GUI icon corresponding to the selected object area, and outputting the set GUI as a home screen for executing at least one of application on a display of the terminal.

17 Claims, 23 Drawing Sheets

(51) Int. Cl.
*G06F 3/0488* (2013.01)
*G06F 9/445* (2018.01)
*G06F 3/04883* (2022.01)

(56) References Cited

U.S. PATENT DOCUMENTS

| | | |
|---|---|---|
| 6,377,288 B1 | 4/2002 | Moran et al. |
| 6,476,834 B1 | 11/2002 | Doval et al. |
| 6,956,562 B1 | 10/2005 | O'Hara et al. |
| 7,164,793 B2 | 1/2007 | Williams et al. |
| 7,176,896 B1* | 2/2007 | Fahraeus ............. G06K 9/22 345/173 |
| 7,298,904 B2 | 11/2007 | Chen et al. |
| 7,320,109 B1 | 1/2008 | Zeevi et al. |
| 7,474,299 B1* | 1/2009 | O'Hara ............. G06F 3/0482 312/223.2 |
| 7,913,185 B1 | 3/2011 | Benson et al. |
| 8,271,908 B2* | 9/2012 | Li ............. G06F 3/0482 715/863 |
| 8,423,916 B2 | 4/2013 | Chihara et al. |
| 8,448,083 B1 | 5/2013 | Migos et al. |
| 9,021,402 B1* | 4/2015 | Li ............. G06F 3/04883 715/863 |
| 9,052,927 B2* | 6/2015 | Baek ............. G06F 9/451 |
| 9,461,882 B1* | 10/2016 | Jenkins ............. G06F 3/0484 |
| 9,530,318 B1* | 12/2016 | Turner ............. G08G 5/065 |
| 9,569,101 B2* | 2/2017 | Kim ............. G06F 3/04883 |
| 9,891,809 B2* | 2/2018 | Jung ............. G06F 3/04886 |
| 2003/0107607 A1* | 6/2003 | Nguyen ............. G06F 3/04883 715/863 |
| 2005/0063592 A1 | 3/2005 | Li et al. |
| 2005/0084082 A1 | 4/2005 | Horvitz et al. |
| 2006/0242607 A1* | 10/2006 | Hudson ............. G06F 3/04817 715/863 |
| 2007/0106931 A1 | 5/2007 | Vartiainen et al. |
| 2008/0174568 A1* | 7/2008 | Kim ............. G06F 16/686 345/173 |
| 2010/0026642 A1* | 2/2010 | Kim ............. G06F 3/0416 345/173 |
| 2010/0122195 A1* | 5/2010 | Hwang ............. H04N 7/142 715/769 |
| 2010/0281435 A1* | 11/2010 | Bangalore ............. G06F 3/04883 715/863 |
| 2010/0315358 A1* | 12/2010 | Chang ............. G06F 3/04883 345/173 |
| 2011/0084925 A1 | 4/2011 | Baik et al. |
| 2011/0119610 A1 | 5/2011 | Hackborn et al. |
| 2011/0202864 A1* | 8/2011 | Hirsch ............. G06F 3/0482 715/773 |
| 2011/0202868 A1 | 8/2011 | Yang et al. |
| 2011/0258581 A1 | 10/2011 | Hu |
| 2012/0005619 A1* | 1/2012 | Jung ............. G06F 9/451 715/780 |
| 2012/0054663 A1 | 3/2012 | Baek et al. |
| 2012/0062693 A1 | 3/2012 | Hada et al. |
| 2012/0094719 A1 | 4/2012 | Choi et al. |
| 2012/0131509 A1 | 5/2012 | Kim et al. |
| 2012/0174007 A1 | 7/2012 | Lee |
| 2012/0290965 A1 | 11/2012 | Ignor et al. |
| 2013/0036374 A1 | 2/2013 | Melamed et al. |
| 2013/0047119 A1 | 2/2013 | Lee |
| 2013/0082965 A1* | 4/2013 | Wada ............. G06F 3/04883 345/173 |
| 2013/0331152 A1* | 12/2013 | Park ............. G06F 9/451 455/566 |
| 2014/0053114 A1* | 2/2014 | Kwon ............. G06F 3/04883 715/863 |
| 2014/0068517 A1* | 3/2014 | Bae ............. G06F 3/04883 715/835 |
| 2014/0165000 A1 | 6/2014 | Fleizach et al. |
| 2014/0165012 A1* | 6/2014 | Shen ............. G06F 9/4451 715/863 |
| 2014/0250143 A1* | 9/2014 | Dai ............. G06K 9/222 707/769 |
| 2014/0320391 A1* | 10/2014 | Bazaz ............. G01C 21/3652 345/156 |
| 2015/0033164 A1* | 1/2015 | Jung ............. G06F 9/451 715/765 |
| 2015/0049009 A1* | 2/2015 | Kluttz ............. G06F 3/04883 345/156 |
| 2015/0063785 A1 | 3/2015 | Lee et al. |
| 2015/0095819 A1 | 4/2015 | Hong et al. |
| 2015/0317053 A1* | 11/2015 | Baek ............. G06F 3/04817 715/765 |
| 2016/0154555 A1* | 6/2016 | Perrin ............. G06K 9/222 715/765 |
| 2018/0101283 A1* | 4/2018 | Lee ............. G06F 3/04883 |

FOREIGN PATENT DOCUMENTS

| | | |
|---|---|---|
| CN | 102298533 A | 12/2011 |
| CN | 102664991 A | 9/2012 |
| CN | 103019821 A | 4/2013 |
| CN | 103064691 A | 4/2013 |
| CN | 103150083 A | 6/2013 |
| EP | 2 116 926 A2 | 11/2009 |
| EP | 2 339 443 A1 | 6/2011 |
| EP | 2 341 422 A2 | 7/2011 |
| EP | 2 423 810 A1 | 2/2012 |
| EP | 2 472 378 A2 | 7/2012 |
| EP | 2 523 433 A1 | 11/2012 |
| KR | 10-2007-0120368 A | 12/2007 |
| KR | 10-2011-0077231 A | 7/2011 |
| KR | 10-2012-0018952 A | 3/2012 |
| KR | 10-2012-0055961 A | 6/2012 |
| RU | 2 420 805 C2 | 3/2006 |
| RU | 2 372 654 C2 | 11/2009 |
| RU | 2008 122 403 A | 12/2009 |
| RU | 2 480 803 C1 | 4/2013 |
| WO | 2007/010344 A2 | 1/2007 |

OTHER PUBLICATIONS

Russian Decision on Grant dated Sep. 9, 2019, issued in Russian Patent Application No. 2018146477.
Korean Office Action dated Oct. 21, 2019, issued in Korean Patent Application No. 10-2013-0089014.
How to Create How to Create Multiple Links on a Single Image With Image Map by OXP Editorial available at https://onextrapixel.com/how-to-create-multiple-links-on-a-single-image-with-image-map/ Apr. 30, 2009.
Chinese Examination report dated Nov. 22, 2021, issued in Chinese Application No. 201910202043.0.

* cited by examiner

METHOD AND APPARATUS FOR PROVIDING GRAPHIC USER INTERFACE

CROSS-REFERENCE TO RELATED APPLICATION(S)

This application is a continuation application of prior application Ser. No. 14/444,242, filed on Jul. 28, 2014, which claimed priority under 35 U.S.C § 119(a) of a Korean patent application number 10-2013-0089014, filed on Jul. 26, 2013, in the Korean Intellectual Property Office, the disclosure of which is incorporated by reference herein in its entirety.

TECHNICAL FIELD

The present disclosure relates to a graphical user interface. More particularly the present disclosure relates to a method and an apparatus for generating and using a graphical user interface.

BACKGROUND

Recently, various services and additional functions provided by terminal apparatuses (particularly, a mobile terminal apparatus) are expanding. In order to increase an effective value of the terminal apparatus and meet user demands, various applications executable by the terminal apparatus have been developed.

The terminal apparatus can store and execute basic applications manufactured by a manufacturer of the terminal apparatus and installed in the terminal apparatus as well as additional applications downloaded from a website selling applications through the Internet. The additional applications may be developed by general developers and registered in the website selling applications. Accordingly, anyone can freely sell applications to the user of the terminal apparatus through the website selling applications. As a result, hundreds of thousands of applications are currently provided to the terminal apparatuses free of charge or at a cost. The terminal apparatus provides user convenience of the terminal apparatus by using a Graphical User Interface (GUI). The terminal apparatus may use a GUI provided during a process of manufacturing the terminal apparatus or a GUI package provided by a website selling an application. However, in order to modify and then use the GUI provided in such a way, the user sets and then uses the GUI by changing a background image, changing an image of an icon used in the GUI within an image of an icon provided in advance, or changing a position of an icon.

SUMMARY

As described above, even though the user changes a GUI, the GUI is configured to be changed within a range of a pre-provided background image or icon image, so that there is a lot of limitations in changing the GUI. Further, since the icon image is formed in a predetermined matrix size, the user cannot set or place the icon image with a size which the user desires. Due to the limitations in setting the GUI, user's demands to use the more creative and personalized GUI cannot be met.

The above information is presented as background information only to assist with an understanding of the present disclosure. No determination has been made, and no assertion is made, as to whether any of the above might be applicable as prior art with regard to the present disclosure.

Aspects of the present disclosure are to address at least the above-mentioned problems and/or disadvantages and to provide at least the advantages described below. Accordingly, an aspect of the present disclosure is to provide a method and an apparatus for configuring and using the Graphical User Interface (GUI) without any limitation in size or placement of the icon.

Another aspect of the present disclosure is to provide a method and an apparatus for improving usability of the terminal apparatus through the GUI which is directly configured by the user.

In accordance with an aspect of the present disclosure, a method of providing a GUI by a terminal is provided. The method includes receiving an image to be used for the GUI, and selecting one or more object areas to be used for the GUI from the image, setting a GUI icon corresponding to the selected object area, and outputting the set GUI as a home screen for executing at least one of application on a display of the terminal.

In accordance with another aspect of the present disclosure, a terminal apparatus is provided. The terminal includes a touch screen that displays information and detects a touch input event input by a user, one or more controllers, and a memory that stores one or more input images and stores one or more programs, wherein the at least one or more programs is configured to be executed by the controller, to include a command for receiving an image to be used for a Graphical User Interface (GUI), selecting one or more object areas to be used for the GUI from the image and for setting a GUI icon corresponding to the selected object area, and outputting the set GUI as a home screen for executing at least one of application on a display of the terminal.

Aspects of the present disclosure have the following effects.

First, it is possible to increase the user's convenience by configuring the GUI through an image freely drawn by the user.

Second, it is possible to variously configure and use the GUI without any limitation in an arrangement or size of icons by configuring the icons on a GUI image including a background image and an icon image.

Third, it is possible to provide a result reflecting a writing input or a gesture input when an application corresponding to an icon is executed, by directly performing the writing input or the gesture input in a state where the icon is displayed to implement the GUI image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While terms including ordinal numbers, such as "first" and "second", etc., may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. The terms used in this application are for the purpose of describing particular embodiments only and are not intended to be limiting of the disclosure. As used herein, the singular forms are intended to include the plural forms as well, unless the context clearly indicates otherwise.

Figure 1A:
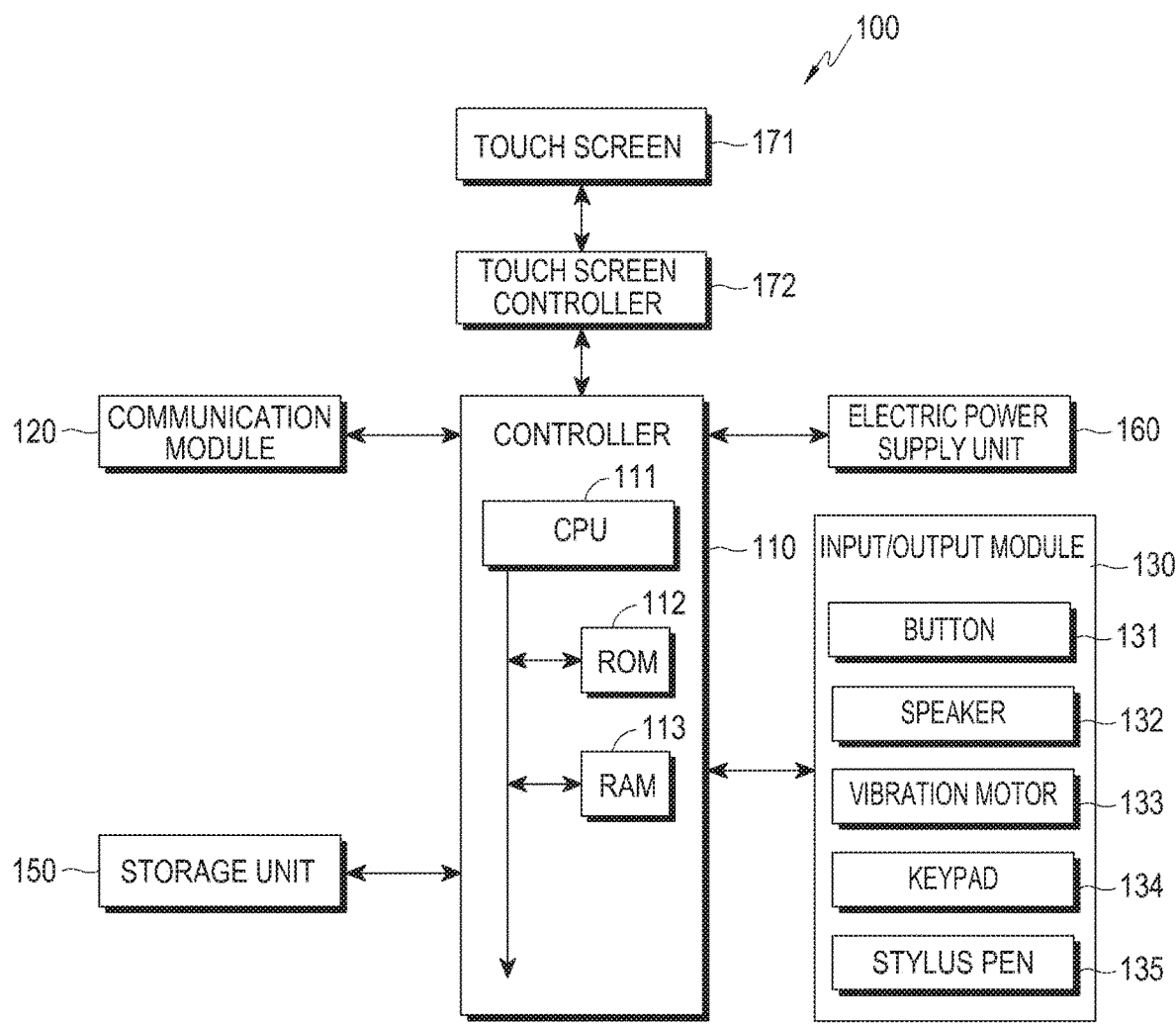
FIG. 1A is a block diagram schematically illustrating a configuration of a terminal apparatus to which a Graphical User Interface (GUI) providing method is applied according to an embodiment of the present disclosure.

FIG. 1A is a block diagram schematically illustrating a configuration of a terminal apparatus applying a Graphical User Interface (GUI) providing method according to an embodiment of the present disclosure.

Referring to FIG. 1A, a terminal apparatus 100 includes a controller 110, a communication module 120, an input/output module 130, a storage unit 150, a power supplier 160, a touch screen 171, and a touch screen controller 172.

The controller 110 may include a CPU 111, a Read Only Memory (ROM) 112 storing a control program for controlling the terminal apparatus 100, and a Random Access Memory (RAM) 113 used as a storage area for storing a signal or data input from the outside of the terminal apparatus 100 or for an operation performed by the terminal apparatus 100. The CPU 111, the ROM 112, and the RAM 113 may be mutually connected to each other through an internal bus. The controller 110 may control the communication module 120, the input/output module 130, the storage unit 150, the power supplier 160, the touch screen 171, and the touch screen controller 172. In addition, the controller 110 may have a single core or a plurality of cores such as a dual core, a triple core, or a quadruple core. The number of cores may vary according to a characteristic or design of the terminal.

The controller 100 receives an image including a drawing drawn by the user or a picture photographed by the user and connects one or more applications to one or more object areas included in the image, so as to configure the one or more object areas as icons of the GUI. When the configured icon of the GUI is selected through a touch input by the user, the controller 110 executes an operation of an application corresponding to the selected icon.

The communication module 120 may include at least one of a cellular module, a wireless LAN module, and a short distance communication module.

The cellular module enables the terminal apparatus 100 to be connected with an external device through mobile communication by using one antenna or a plurality of antennas according to a control of the controller 110. The cellular module transmits/receives a wireless signal for a voice call, a video call, a Short Message Service (SMS), or a Multimedia Message Service (MMS) to/from a mobile phone (not shown), a smart phone (not shown), a tablet Personal Computer (PC), or another device (not shown) having a phone number input into the terminal apparatus 100.

The wireless LAN module may access the Internet in a place where a wireless Access Point (AP) (not shown) is installed according to a control of the controller 110. The wireless LAN module supports a wireless LAN standard (IEEE802.11x) of the Institute of Electrical and Electronics Engineers (IEEE). The wireless LAN module may drive a Wi-Fi Positioning System (WPS) that identifies position information on the terminal including the wireless LAN module by using position information provided by the wireless AP wirelessly connected with the wireless LAN module.

The short distance communication module corresponds to a module that wirelessly processes short distance communication with the terminal apparatus 100 according to a control of the controller 110, and may process communication based on Bluetooth, Infrared Data Association (IrDA) communication, WiFi-Direct communication, or a short distance communication scheme such as Near Field Communication (NFC).

The input/output module 130 may include at least one of a button 131, a speaker 132, a vibration motor 133, a keypad 134, and a stylus pen 135.

The buttons 131 may be formed on a front surface, a side surface, or a rear surface of the housing of the terminal apparatus 100, and may include at least one of a power/lock button (not shown), a volume button (not shown), a menu button, a home button, a back button, and a search button.

The speaker 132 may output sounds corresponding to various signals (for example, a wireless signal, a broadcasting signal, and the like) of the cellular module, the wireless LAN module, and the short distance communication module to the outside of the terminal apparatus 100 according to a control of the controller 110. One speaker 132 or a plurality of speakers 132 may be formed on a suitable position or positions of the housing of the terminal apparatus 100.

The vibration motor 133 may convert an electrical signal to a mechanical vibration according to a control of the controller 110. One vibration motor 133 or a plurality of vibration motors 133 may be formed within the housing of the terminal apparatus 100.

The speaker 132 and the vibration motor 133 may operate according to a setting state of a volume operation mode of the terminal apparatus 100. For example, the volume operation mode of the terminal apparatus 100 may include a sound mode, a vibration mode, a sound/vibration mode, and a mute mode, and may be set as one such mode. The controller 110 may output a signal instructing the speaker 132 or the vibration motor 133 to execute an operation thereof according to a function performed by the terminal apparatus 100 based on the set mode of the volume operation mode.

The keypad 134 may receive a key input from the user to control the terminal apparatus 100. The keypad 134 includes a physical keypad (not shown) formed in the terminal apparatus 100 or a virtual keypad (not shown) displayed on the touch screen 171. The physical keypad (not shown) formed in the terminal apparatus 100 may be omitted according to a capability, design, or structure of the terminal apparatus 100.

The stylus pen 135 is implemented to provide a signal which can detect a touch input of the touch screen 171. As the stylus pen 135 approaches or contacts the touch screen 171, the touch screen 171 may detect a signal provided by the stylus pen 135.

The storage unit 150 may store an input/output signal or data corresponding to operations of the communication module 120, the input/output module 130, and the touch screen 171 according to a control of the controller 110. The storage unit 150 may store a control program and applications for controlling the terminal apparatus 100 or the controller 110.

The term "storage unit" includes the storage unit 150, the ROM 112 and the RAM 113 within the controller 110, or a memory card (not shown) (for example, an SD card or a memory stick) installed in terminal apparatus 100. The storage unit may include a non-volatile memory, a volatile memory, a Hard Disk Drive (HDD), or a Solid State Drive (SSD).

The power supplier 160 may supply power to one battery or a plurality of batteries (not shown) arranged at the terminal apparatus 100 according to a control of the controller 110. The one or more batteries (not shown) supply power to the terminal apparatus 100. Further, the power supplier 160 may supply power input from an external power source (not shown) to the terminal apparatus 100 through a wired cable connected to a connector included in the terminal apparatus. In addition, the power supplier 160 may supply power wirelessly input from the external power source through a wireless charging technology to the terminal apparatus 100.

The touch screen 171 may display a user interface corresponding to various services (for example, a call, data transmission, and the like) to the user based on an Operating System (OS) of the terminal. The touch screen 171 may transmit an analog signal corresponding to at least one touch input into the user interface to the touch screen controller 172. The touch screen 171 may receive at least one touch through a user's body (for example, fingers including a thumb) or a touchable input means (for example, a stylus pen).

The touch screen 171 may be implemented in a resistive type, a capacitive type, an infrared type, or an acoustic wave type.

The touch screen controller 175 controls an output value of the touch screen 171 such that a display data provided by the controller 110 is displayed on the touch screen 171. The touch screen controller 172 converts an analog signal received from the touch screen 171 to a digital signal (for example, X and Y coordinates) and transmits the converted digital signal to the controller 110. The controller 110 may control the touch screen 171 by using the digital signal received from the touch screen controller 172. For example, the controller 110 may allow a short-cut icon (not shown) displayed on the touch screen 171 to be selected or a short-cut icon (not shown) to be executed in response to a touch event or a hovering event. Further, the touch screen controller 172 may be included in the controller 110.

Figure 1B:
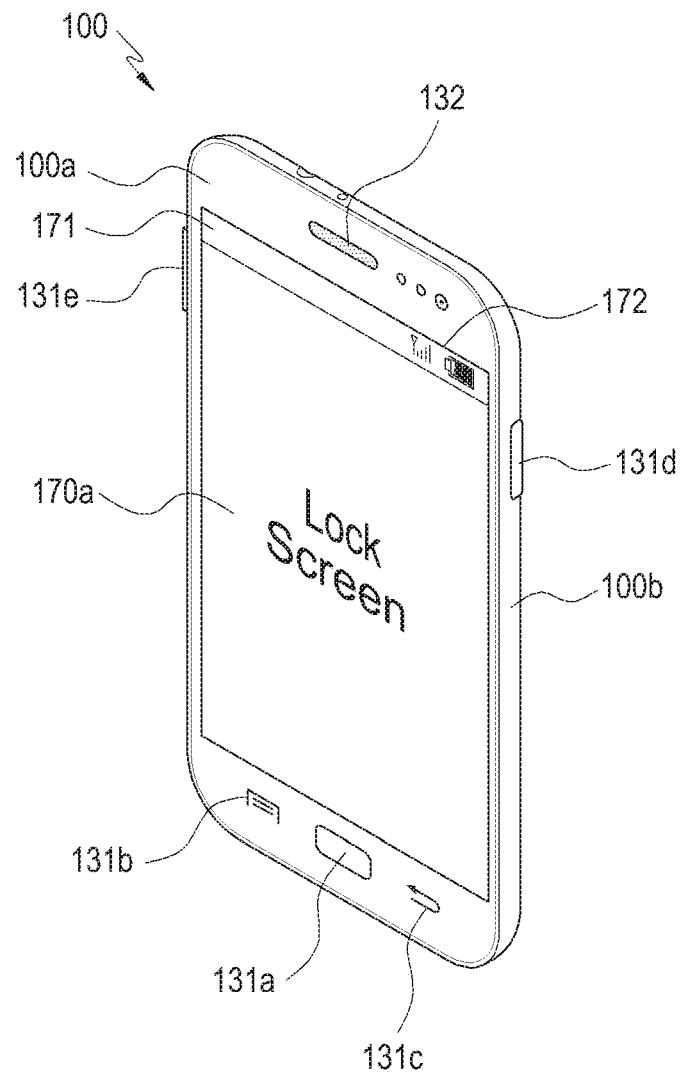
FIGS. 1B and 1C are front perspective views of a terminal apparatus to which a GUI providing method is applied according to an embodiment of the present disclosure.
Figure 1C:
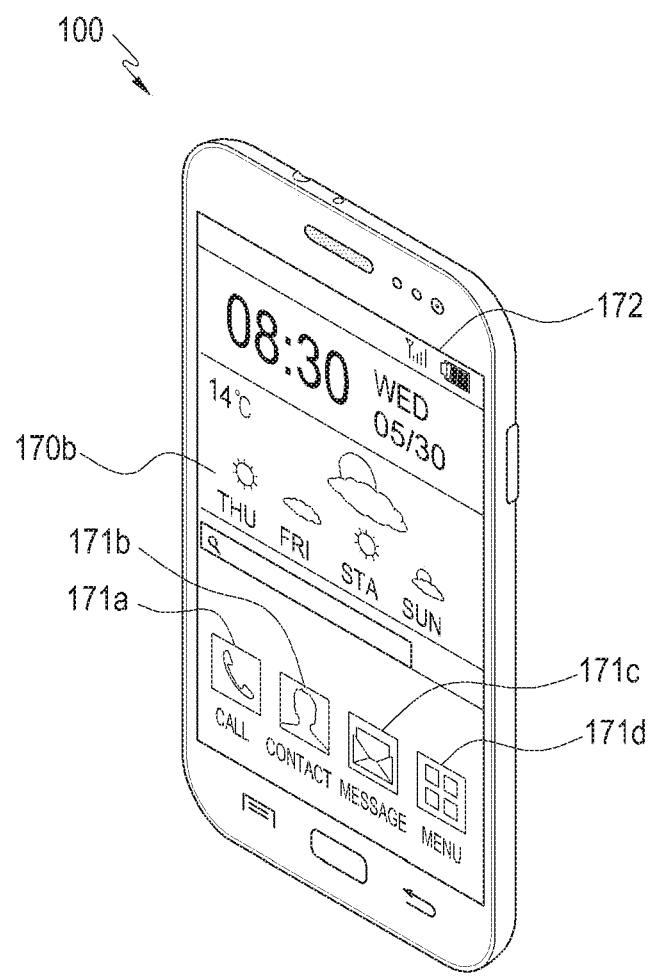

FIGS. 1B and 1C are front perspective views of a terminal apparatus applying a GUI providing method according to an embodiment of the present disclosure.

Referring to FIGS. 1B and 1C, the touch screen 171 is disposed on a center of a front surface 100a of the terminal apparatus 100. The touch screen 171 has a large size to occupy most of a front surface 100a of the terminal apparatus 100. FIG. 1B illustrates an example where a lock screen 170a is displayed on the touch screen 171. The lock screen 170a is a first screen displayed on the touch screen 171 when the terminal apparatus 100 is turned on, and provides an environment in which the user may input security information (for example, password, security pattern, and the like) set by the user to access the terminal apparatus. Accordingly, the controller 110 identifies validity of the security information (for example, password, security pattern, and the like) input by the user, and then releases the lock screen to perform an operation of switching to the home screen 170b of FIG. 1C.

The lock screen 170a may be configured to receive a password or a security pattern. When the user does not set separate security information, the terminal apparatus may be configured to switch to the home screen by a touch input or a drag input of the user without the input of the password or security pattern.

The home screen 170b may include several pages of different home screens, and a first home screen among the several different pages of home screens may be a main home screen. Short-cut icons 171a, 171b, and 171c for executing frequently used applications, a main menu switching key 171d, time, and weather may be displayed on the home screen 170b. The main menu switching key 171d displays a menu screen on the touch screen 171. A status bar 172 that displays a status of the terminal apparatus 100, such as a battery charging status, intensity of a received signal, current time, and a volume operation mode, may be formed on an upper end of the touch screen 171.

According to the embodiment of the present disclosure, the home screen 170b may include the GUI including icons connected to applications in order to execute the applications. Further, when the icon included in the GUI is selected while the GUI included in the home screen is displayed, the controller 110 may control the corresponding application to be executed.

A home button 131a, a menu button 131b, and a back button 131c may be formed below the touch screen 171.

The home button 131a displays the main home screen on the touch screen 171. For example, when the home button 131a is touched while a home screen different from the main home screen or the menu screen is displayed on the touch screen 171, the main home screen may be displayed on the touch screen 171. When the home button 171a is touched while applications are executed on the touch screen 171, the main home screen illustrated in FIG. 1 may be displayed on the touch screen 171. In addition, the home button 131a may be used to display recently used applications or a task manager on the touch screen 171.

The menu button 131b provides a connection menu which can be used on the touch screen 171. The connection menu includes a widget addition menu, a background changing menu, a search menu, an editing menu, an environment setup menu, and the like.

The back button 131c may display the screen which was executed just before the currently executed screen or end the most recently used application.

The speaker 132 may be arranged at an upper center part of the front surface 100a of the terminal apparatus 100. A power/reset button 131d, a volume button 131e, and the like may be arranged at the side surface 100b of the terminal apparatus 100.

Methods according to various embodiments of the present disclosure may be implemented in a type of a program command which can be performed through various computer means and recorded in a computer-readable medium. The computer-readable medium may include a program command, a data file, and a data structure individually or a combination thereof. The program command recorded in the medium may be designed and configured specifically for the present disclosure or may be known and used by those skilled in the computer software field.

Further, various embodiments of the present disclosure may be implemented in a type of a program command and stored in the storage unit 150 of the terminal apparatus 150, and the program command may be temporarily stored in the RAM 113 included in the controller 110 to execute the methods according to the various embodiments of the present disclosure. Accordingly, the controller 110 may control hardware components included in the terminal apparatus 100 in accordance with the program command based on the methods according to the various embodiments of the present disclosure, temporarily or continuously store data generated while the methods according to the various embodiments of the present disclosure are executed in the stored unit 150, and provide a UI required for executing the methods according to the various embodiments of the present disclosure to the touch screen controller 172.

A GUI providing method according to an embodiment of the present disclosure is provided to the terminal apparatus 100 and thus an operation thereof is executed. However, the present disclosure is not limited thereto, and the GUI providing method according to an embodiment of the present disclosure may be provided to various terminals having an environment where the GUI is provided, such as a PC, a laptop computer, and a tablet PC.

Figure 2:
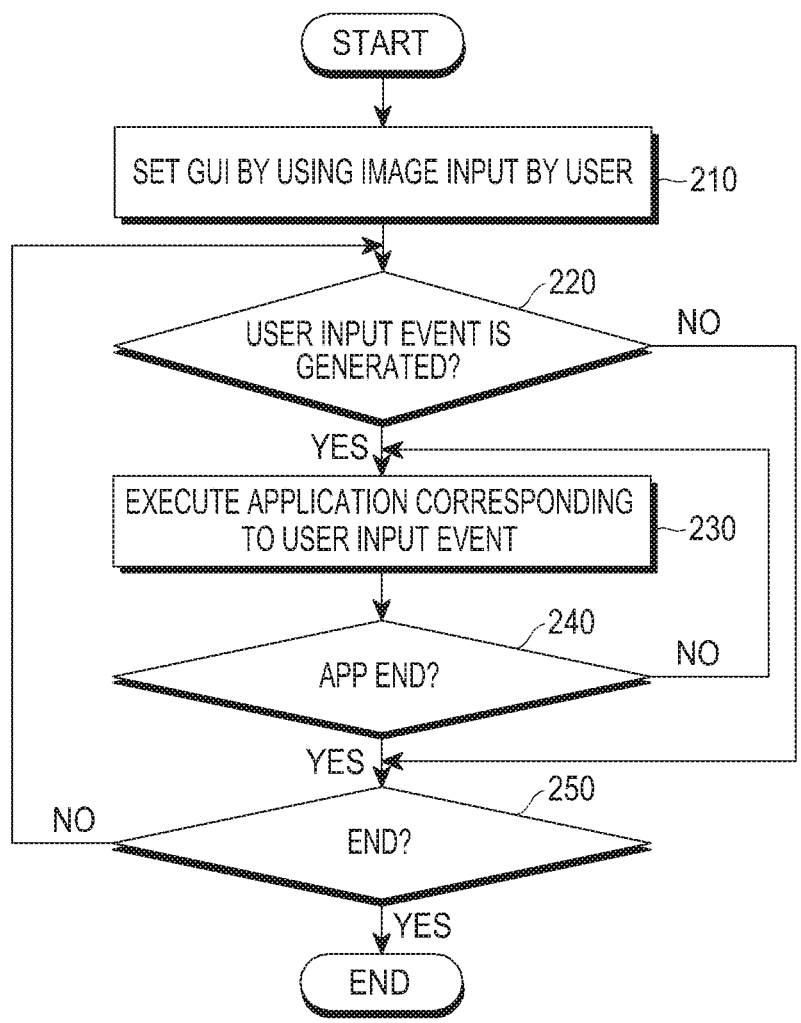
FIG. 2 is a flowchart illustrating an operation order of a GUI providing method according to an embodiment of the present disclosure.
Figure 3:
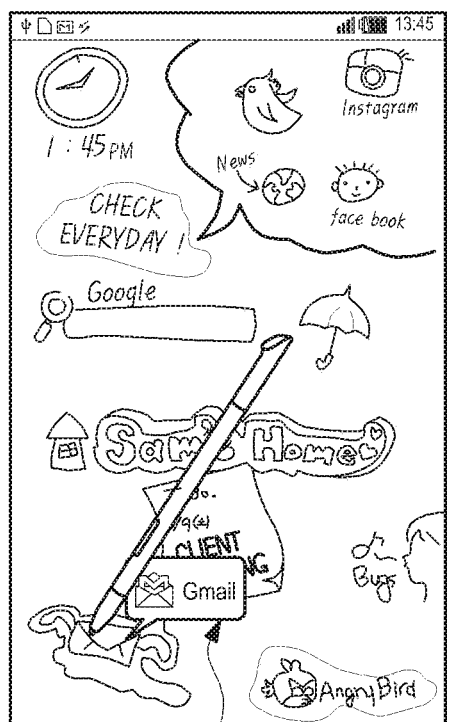
FIG. 3 illustrates an example of a GUI provided based on a GUI providing method according to an embodiment of the present disclosure.

FIG. 2 is a flowchart illustrating an operation order of the GUI providing method according to an embodiment of the present disclosure. FIG. 3 illustrates an example of a GUI provided based on a GUI providing method according to an embodiment of the present disclosure.

Referring to FIGS. 2 and 3, the GUI providing method according to the embodiment of the present disclosure may include operation 210 of setting a GUI by using an image and operations 220 to 240 of executing an application by using the GUI.

The controller 110 receives an image from the user in operation 210. For example, the image received from the user may be a drawing drawn by the user or a picture photographed by the user. Further, the controller 110 may connect one or more applications to areas ("object areas") where one or more objects included in the image exist, so as to configure the one or more object areas as icons of the GUI. One or more execution commands may be allocated to the one or more object areas included in the image, respectively. The one or more execution commands may include a command executing one application, an execution command including one or more application execution factors, or execution commands of a plurality of applications. When the one or more execution commands include execution commands of a plurality of applications, the execution commands of the plurality of applications connected to one or more object areas included in the image may be processed in a macro form, and accordingly, macro information may be further set.

The object area may be configured in a widget form and display the one or more object areas reflecting predetermined data.

As described above, when a user input event, for example, a touch input by the user is generated while the GUI set through operation 210 is displayed on the home screen of the terminal apparatus 100, the controller 110 identifies an area where the touch input by the user is generated in operation 220. The controller 110 identifies an icon corresponding to the area where the touch input is generated and executes an operation of an application corresponding to the icon in operation 230. The controller 110 repeatedly performs operation 230 until the execution of the application corresponding to the icon ends in operation 240.

In operation 220, the controller 110 may detect the touch input by the user such as a hovering and provide an image 301 of FIG. 3 (for example, icon image of the corresponding application) indicating the application corresponding to the icon located at the corresponding area in response to the touch input by the user such as the hovering. When execution commands of a plurality of applications are allocated to the image, the controller 110 may display a plurality of icon images corresponding to the plurality of applications corresponding to the icons located at the corresponding area when the touch input by the user such as the hovering is made.

When the touch input by the user is not made in operation 220, the controller 110 waits for generation of the touch input by the user.

The controller 110 repeatedly performs operations 220 to 240 until the terminal apparatus ends the method in operation 350.

Figure 4:
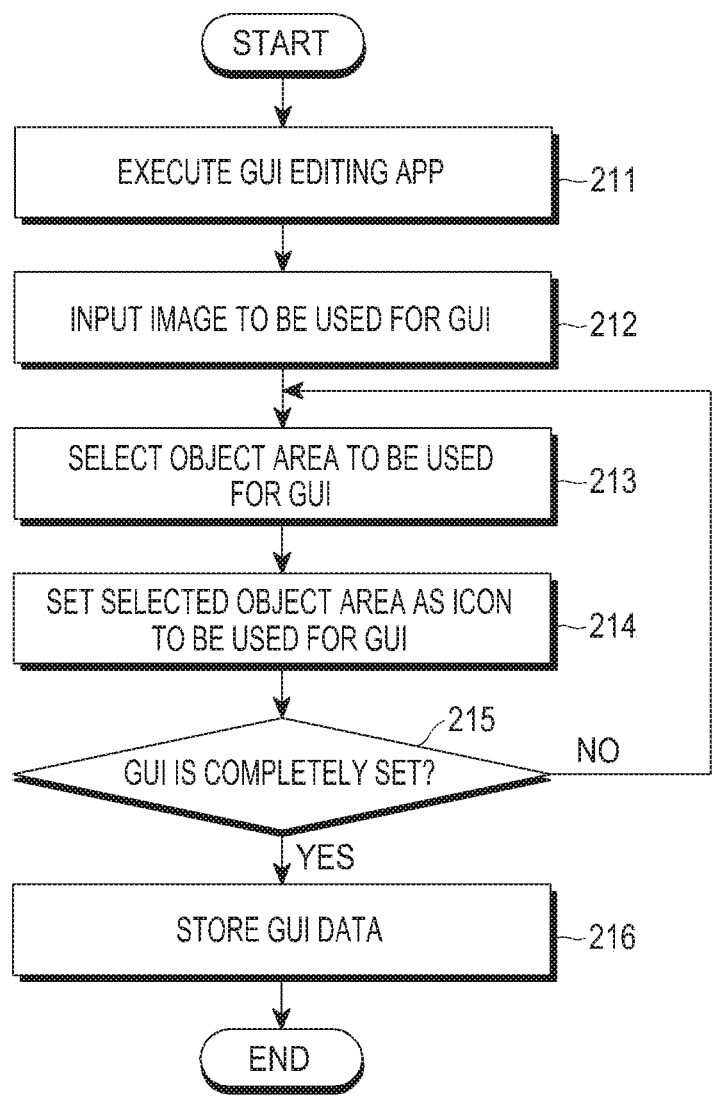
FIG. 4 is a flowchart illustrating a detailed order of a process of setting a GUI included in a GUI providing method according to an embodiment of the present disclosure.
Figure 5A:
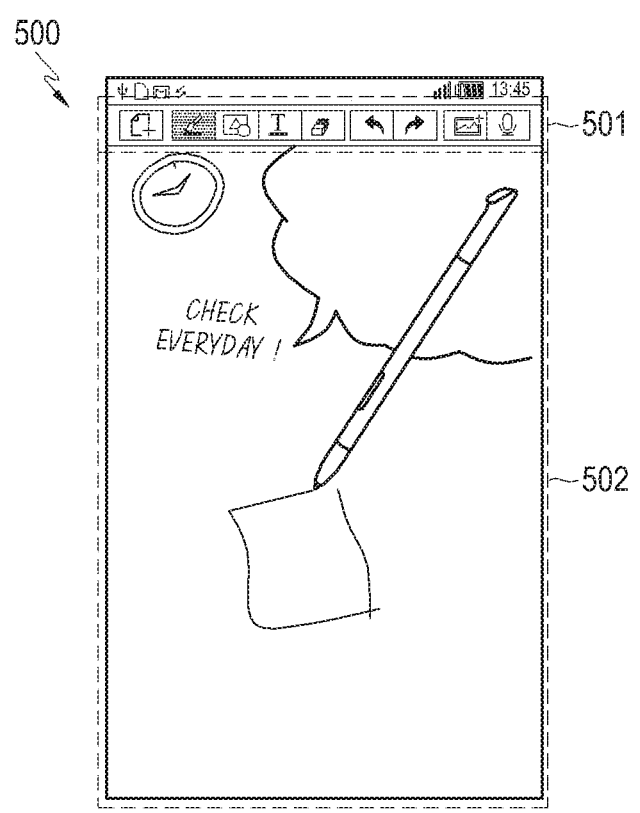
FIGS. 5A, 5B, and 5C illustrate an example of a GUI editing program used for a GUI providing method according to an embodiment of the present disclosure.
Figure 5B:
Figure 5C:
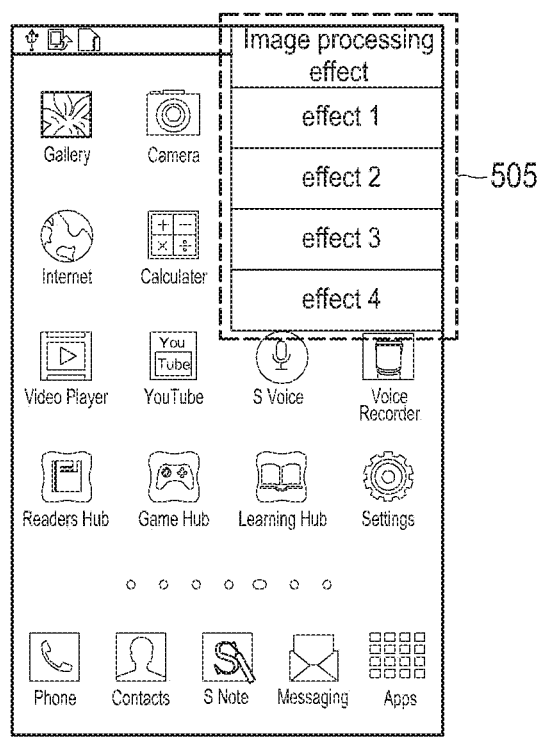
Figure 6:
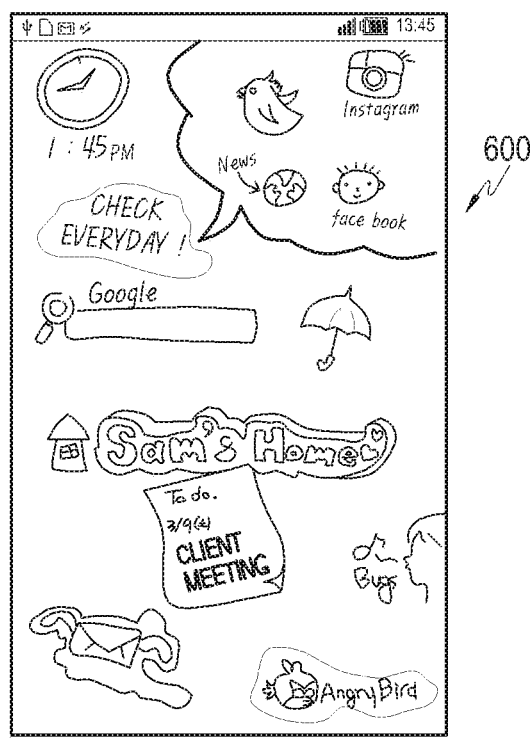
FIG. 6 illustrates an example of an image to be applied to a GUI used for a GUI providing method according to an embodiment of the present disclosure.
Figure 7A:
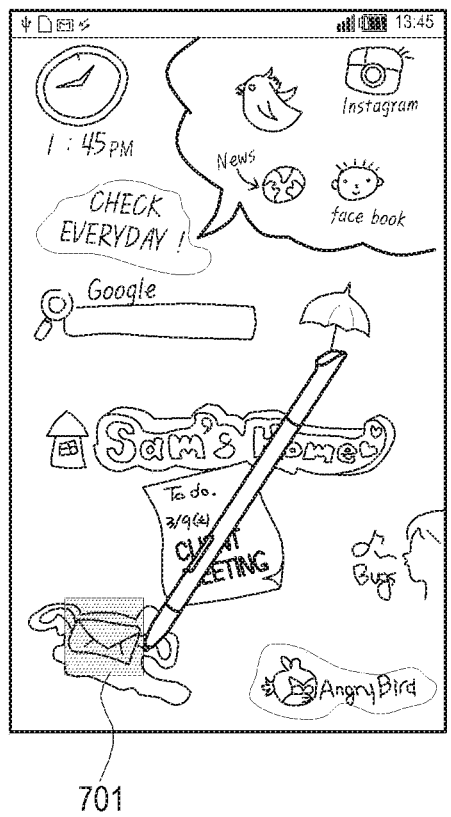
FIGS. 7A, 7B, 7C, and 7D illustrate an example of an operation for selecting an object area in a GUI providing method according to an embodiment of the present disclosure.
Figure 7B:
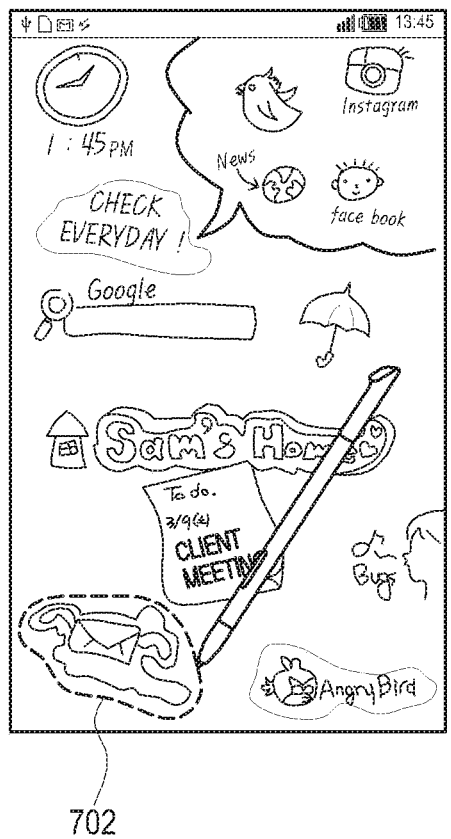
Figure 7C:
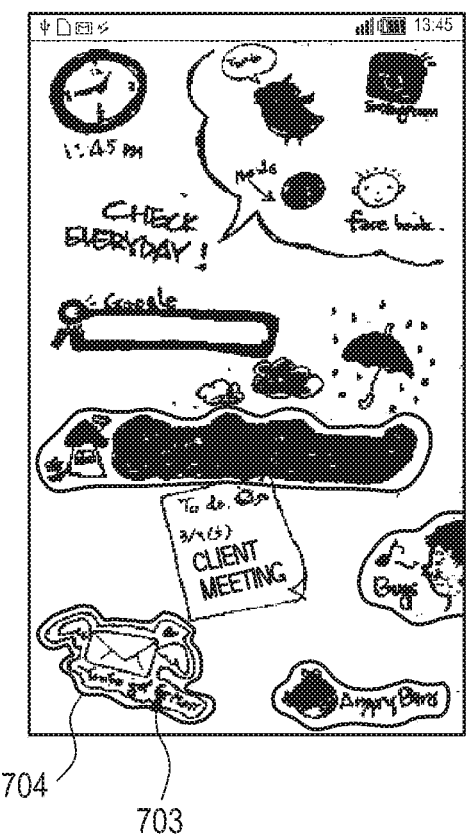
Figure 7D:
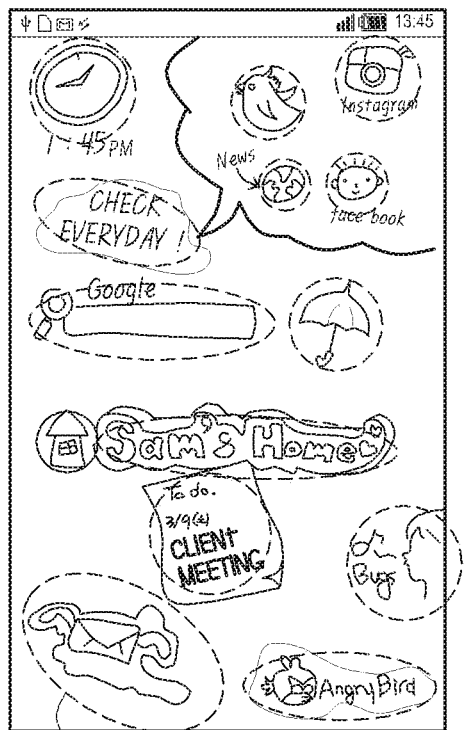
Figure 8A:
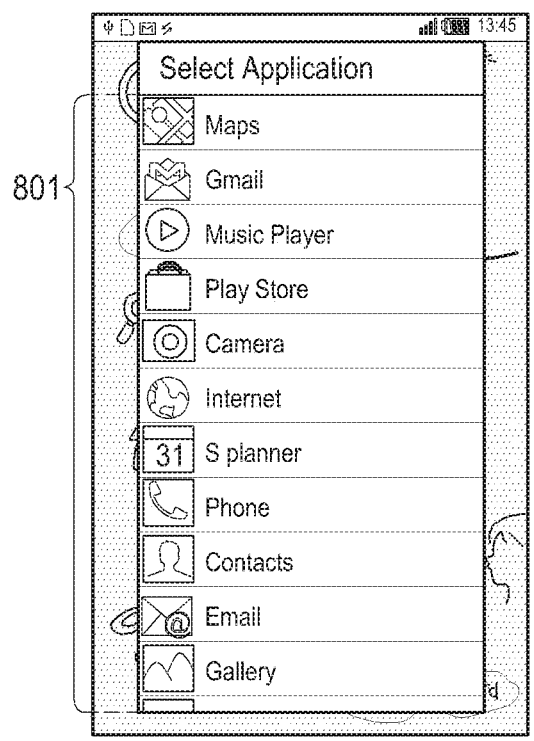
FIGS. 8A, 8B, and 8C illustrate an example of an operation for selecting an application connected to an object area in a GUI providing method according to an embodiment of the present disclosure.
Figure 8B:
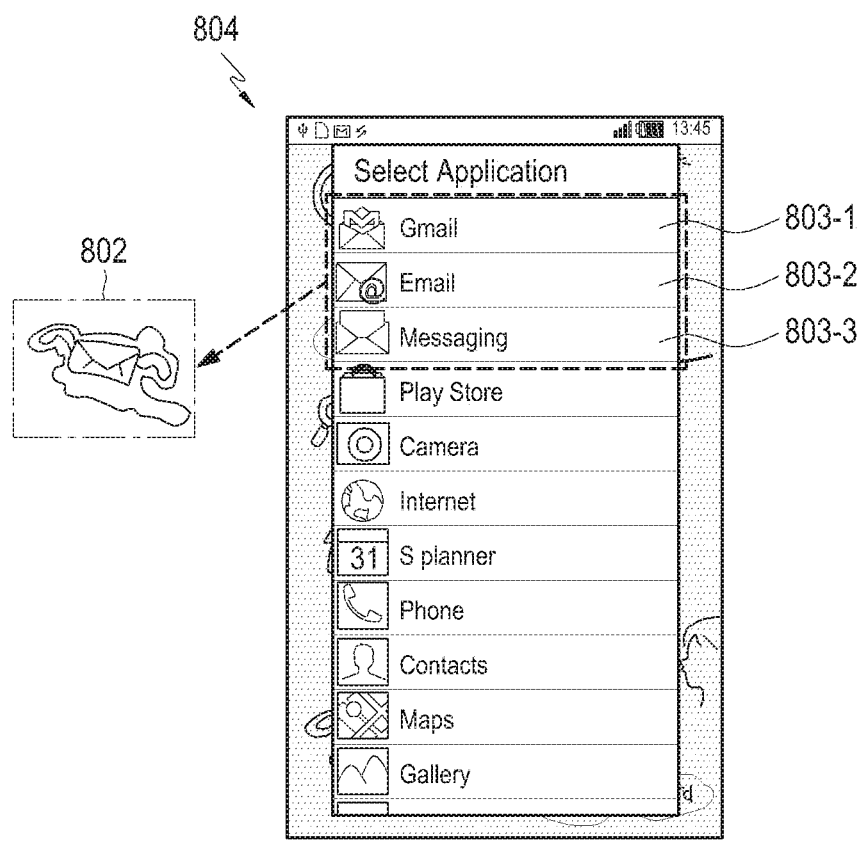
Figure 8C:
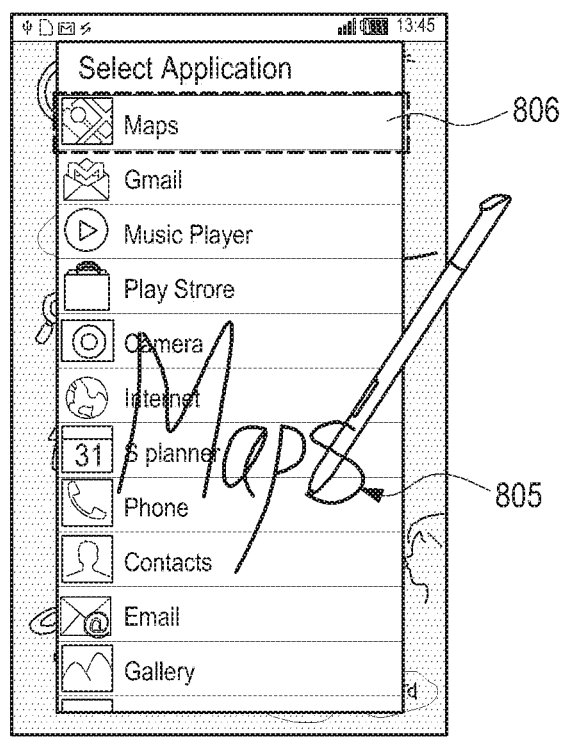

FIG. 4 is a flowchart illustrating a detailed order of a process of setting the GUI included in a GUI providing method according to an embodiment of the present disclosure. FIGS. 5A, 5B, and 5C illustrate an example of a GUI editing program used for a GUI providing method according to an embodiment of the present disclosure. FIGS. 7A, 7B, 7C, and 7D illustrate an example of an operation for selecting an object area in a GUI providing method according to an embodiment of the present disclosure. FIGS. 8A, 8B, and 8C illustrate an example of an operation for selecting an application connected to an object area in a GUI providing method according to an embodiment of the present disclosure. FIGS. 9A, 9B, 9C, and 9D illustrate an example of GUI data used for a GUI providing method according to an embodiment of the present disclosure Referring to FIG. 4 and FIGS. 5A-9D, the process of setting the GUI may initiate an operation by executing a GUI editing program included in the terminal to edit the GUI in operation 211. For example, the GUI editing program may be executed when an icon corresponding to the GUI editing program is displayed on a home screen 170b and the user selects the icon corresponding to the GUI editing program. The GUI editing program 500 (as shown in FIG. 5A) may provide a drawing tool 501 by which the user can freely generate a new image. The GUI editing program 500 may provide a drawing window 502 on which the user can freely draw a new image by using the drawing tool 501.

The drawing window 502 may generate and combine a plurality of layers in order to allow the user to more easily draw a new image. For example, through the drawing window 502, the user may generate one or more layers, and generate an image by selectively combining the generated one or more layers. Further, the drawing window 502 may generate one or more layers by loading images stored in the storage unit 150. For example, as illustrated in FIG. 5B, the GUI editing program 500 may form one first layer 503 by loading the image stored in the storage unit 150 and form a second layer 504 which overlaps the first layer 503 and in which an image drawn by the user is generated. Further, the GUI editing program 500 may form an image including both the first layer 503 and the second layer 504 or selectively form an image only including the second layer 504. Accordingly, the user may more easily draw a desired image by using the image included in the first layer 503.

Alternatively, the GUI editing program 500 may configure an image by applying a predetermined image processing effect (or filter) 505 (as shown in FIG. 5C) to the image stored in the storage unit 150 even though the user does not directly draw the image.

As described above, as the user configures the image to be used for the GUI by using the drawing tool 501, the drawing window 502, and the image processing effect 505 provided by the GUI editing program 500, the controller 110 stores the image, which is configured by the user, to be used for the GUI in the storage unit 150 in operation 212. In operation 212, the controller 110 sets an image 600 (as shown in FIG. 6) to be used for the GUI.

In operation 213, the controller 110 sets an object area to be used for the GUI in the image used for the GUI. The object area to be used for the GUI may be set based on an area input by the user. For example, the GUI editing program 500 may provide an object setting function which can set an object area by the user. The object setting function sets an object area 701 (as shown in FIG. 7A) by configuring an area input through a touch or drag by the user as a quadrangular shape. Alternatively, the object setting function may set an object area 702 (as shown in FIG. 7B) by configuring a closed figure generated by freely connecting areas input by a touch input or drag input of the user. Accordingly, the controller 110 may set the object area by receiving the object area from the user through the object setting function provided by the GUI editing function 500.

Alternatively, the object setting function may automatically configure the object area by applying an image processing algorithm to an image to be used for the GUI. For example, as illustrated in FIG. 7C, after the image processing algorithm for detecting an edge area from the image to be used for the GUI is applied, an edge 704 of an object 703 included in the image is detected, and an object area 705 (as shown in FIG. 7D) is set based on the detected edge. Accordingly, the controller 110 may set the object area by automatically detecting the object area from the image to be used for the GUI through the object setting function provided by the GUI editing function 500.

In operation 214, the controller 110 connects an application to the object area to be used for the GUI, so as to set the object area to function as an icon. For example, the controller 110 displays an application list 801 (as shown in FIG. 8A) including lists of one or more applications stored in the terminal apparatus on the touch screen 171. The controller 110 receives an application to be connected to the object area to be used for the GUI among the application list 801 from the user. Accordingly, the controller 110 connects the received application to the object area to be used for the GUI, so as to set a corresponding icon.

The application list may include one or more applications stored in the terminal apparatus, and the controller 110 may arrange and display the one or more applications in consideration of use frequency, a size of capacity of the application, and a character arrangement order (for example, Korean alphabetical order, an English alphabetical order, or an order appropriate for a language/locale used by the terminal apparatus). In arranging the one or more applications, it is preferable that the controller 110 may arrange an application having relatively high similarity with the object area to be used for the GUI first in order to more easily select the application to be connected to the object area. For example, after cutting an image included in the object area, the controller 110 may search for icon images 803-1, 803-2, and 803-3 (as shown in FIG. 8B) corresponding to the cut image 802 based on an image searching algorithm, and then arrange the found application first as indicated by a reference numeral 804. For example, the controller 110 may load an API that acquires lists of one or more applications stored in the terminal apparatus, identify the one or more applications stored in the terminal apparatus, and search for the icon images 803-1, 803-2, and 803-3 (see FIG. 8B) corresponding to the cut image 802 in icon images of the identified one or more applications.

Alternatively, as illustrated in FIG. 8C, the controller 110 may receive a user input through a writing input 805 or a character input from the user, search for an application file name (application name or application type) corresponding to the user input based on a character searching algorithm, and then arrange the found application 806 first. For example, the controller 110 may load an API that acquires lists of one or more applications stored in the terminal apparatus, identify the one or more applications stored in the terminal apparatus, and search for an application corresponding to the writing input 805 or the character input in file names (application names or application types) of the identified one or more applications. In operation 215, the controller determines whether the GUI is set; if the GUI is not completely set, operations 213-215 are repeated.

Figure 9A:
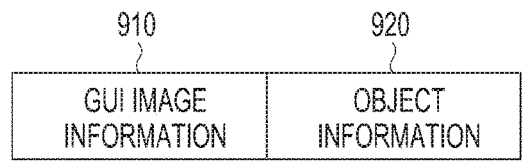
FIGS. 9A, 9B, 9C, and 9D illustrate an example of GUI data used for a GUI providing method according to an embodiment of the present disclosure.
Figure 9B:
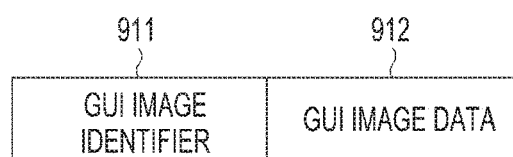
Figure 9C:
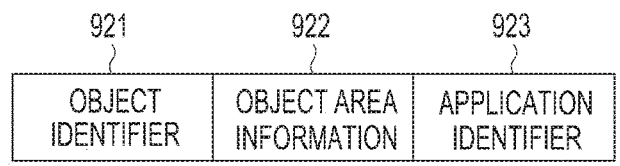

The controller 110 may further perform operation 216 of storing data (for example, GUI data) configured through the above described process. Referring to FIGS. 9A to 9C, the GUI data may include GUI image information 910 and object information 920. The GUI image information 910 includes information on an image input by the user, for example, a GUI image identifier 911 and GUI image data 912 including an image value input to be used as the GUI. The object information 920 may include an object identifier 921 for identifying one or more object areas included in the GUI image, object area data 922 indicating the object area (for example, a position where the object area exists or a range of an area where the object area exists), and an application identifier 923 connected to the object area. In addition, since one or more object areas may be included within the GUI image, it is apparent that the object area 920 may include the object identifiers 921 corresponding to the number of object areas included in the GUI image, object area data 922, and application identifiers 923.

Figure 10:
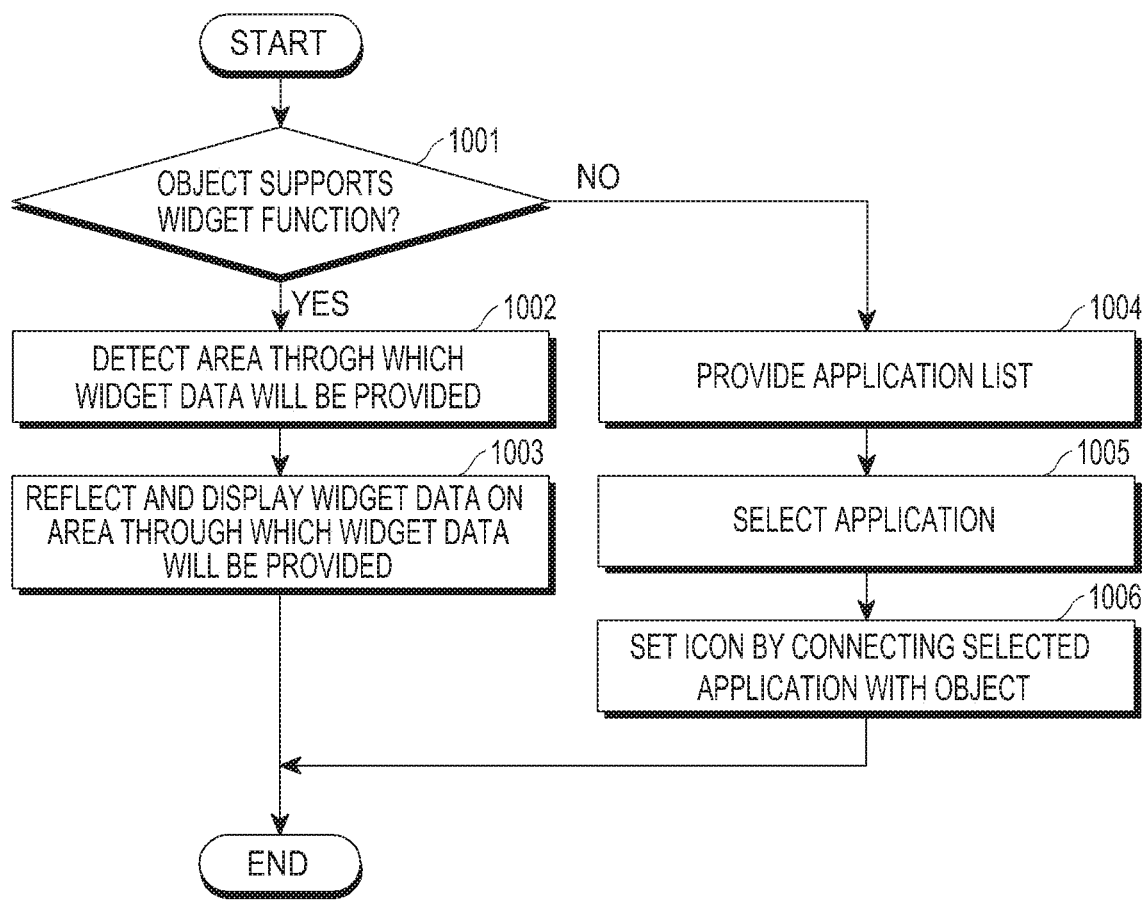
FIG. 10 is a flowchart illustrating another embodiment of a GUI providing method according to an embodiment of the present disclosure.
Figure 11:
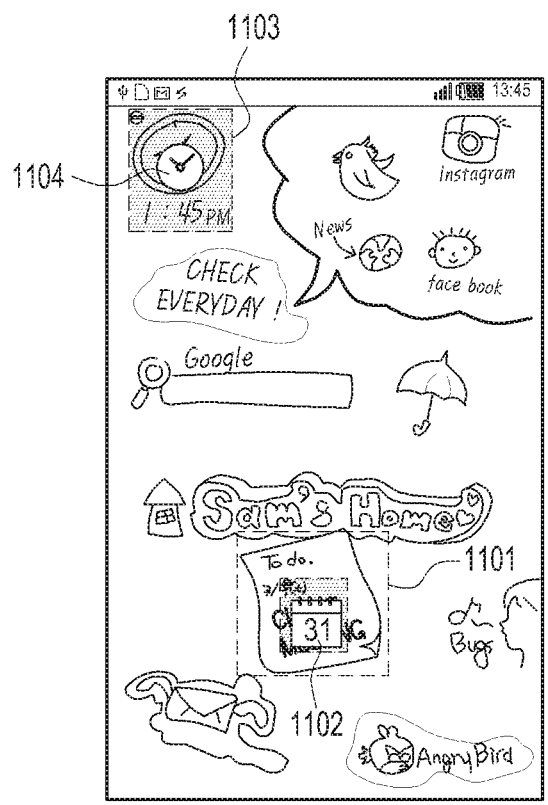
FIG. 11 illustrates an example of an operation for setting a widget data area used for a GUI providing method according to an embodiment of the present disclosure.

FIG. 10 is a flowchart illustrating another embodiment of a GUI providing method according to an embodiment of the present disclosure. FIG. 11 illustrates an example of an operation for setting a widget data area used for a GUI providing method according to an embodiment of the present disclosure.

Referring to FIGS. 10 and 11, the controller 110 determines whether the object area selected in operation 213 corresponds to an application supporting a widget function in operation 1001. The controller 110 first cuts images included in the object area, and then searches for application images corresponding to the cut images 1101 and 1103 based on an image searching algorithm. Further, the controller 110 may determine whether an application corresponding to the found application image supports the widget function to determine whether the selected object area corresponds to the application providing the widget function. Information on whether the application supports the widget function may be stored during a process of storing the application in the terminal apparatus, and the application providing the widget function may be configured to detect and provide data to be used for the widget function.

In searching for the application image in operation 1001, the controller 110 may search for application images in images of the application icons and images used while executing the applications. In searching for the application image, the controller 110 may further use similarity between the cut image 1101 and 1103 and the found application image. For example, when similarity between the cut images 1101 and 1103 and the found application image exceeds a predetermined threshold, the controller 110 may determine that the application image has been found. When the similarity is equal to or smaller than the predetermined threshold, the controller 110 may determine that the application image has not been found.

The application supporting the widget function may detect data related to the time, detect data related to a schedule of a "watch application" providing the detected data through a predetermined area of the widget, and include a "calendar application" providing the detected data through a predetermined area of the widget. Although the "watch application" and the "calendar application" which can provide relatively simple data through the widget have been described as examples in consideration of the fact that the embodiment of the present disclosure is configured to use the image input by the user as the GUI, the present disclosure is not limited thereto and the application supporting the widget function may be variously modified or applied.

When the selected object area corresponds to the application supporting the widget function, the controller 110 detects areas 1102 and 1104 through which widget data is provided from the images 1101 and 1103 included in the object area, in order to implement the widget function in the object area. For example, when the selected object area corresponds to the "watch application" in operation 1001, the controller 110 detects the area 1104 into which data related to the time is inserted from the image 1103 included in the object area. In operation 1003, the controller 110 may display the detected area reflecting the data (for example, a current date, a current time and the like) related to the time.

When the selected object area does not correspond to the application supporting the widget function, the controller 110 displays the application list 801 (as shown in FIG. 8A) including lists of one or more applications stored in the terminal apparatus on the touch screen 171 in operation 1004. The application list may include one or more applications stored in the terminal apparatus, and the controller 110 may arrange and display the one or more applications in consideration of use frequency, a size of capacity of the application, and a character arrangement order (for example, Korean alphabetical order or an English alphabetical order). In arranging the one or more applications, the controller 110 may arrange an application having relatively high similarity with the object area to be used for the GUI first, in order to more easily select the application to be connected to the object area. For example, after cutting an image included in the object area, the controller 110 may search for icon images 803-1, 803-2, and 803-3 (as shown in FIG. 8B) corresponding to the cut image 802 based on an image searching algorithm, and then arrange the found application first. Alternatively, the controller 110 may receive a user input through a writing input 805 (as shown in FIG. 8C) or a character input from the user, search for an application file name (application name or application type) corresponding to the user input based on a character searching algorithm, and then arrange the found application 806 first (as shown in FIG. 8C).

In operation 1005, the controller 110 receives an application to be connected to the object area to be used for the GUI from the user. Accordingly, the controller 110 connects the received application to the object area to be used for the GUI, so as to set a corresponding icon in operation 1006.

As described above, according to another embodiment of operation 214 of FIG. 4 described with respect to FIG. 10, the GUI data may be configured differently depending on whether the selected object area corresponds to the application supporting the widget function. Accordingly, the controller 110 may configure the GUI data constructed in operation 216 differently in accordance with another embodiment of operation 214.

Figure 9D:
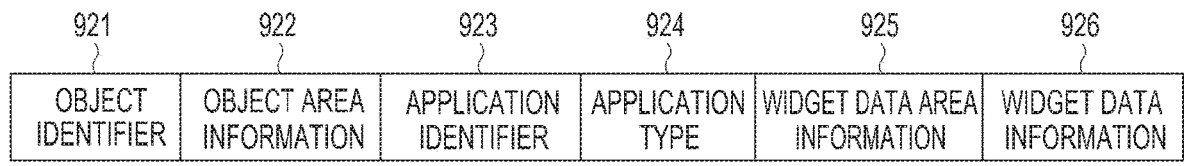

Referring to FIG. 9D, the controller 110 may allow the object information 920 included in the GUI data 900 to further include application type information 924 indicating a type of the application together with the object identifier 921, the object area data 922, and the application identifier 923. The application type information 924 may include information indicating whether the object area corresponds to the application supporting the widget function. Further, when data stored in the application type information 924 indicates that the object area corresponds to the application which does not support the widget function, it is not required to separately store data related to the widget function. When the data stored in the application type information 924 indicates that the object area corresponds to the application supporting the widget function, the controller 110 may configure the object information 920 to further include the data related to the widget function. Accordingly, when the data stored in the application type information 924 indicates that the object area corresponds to the application supporting the widget function, the controller 110 may configure the object information 920 to further include information on an area to which the widget function is applied within the object area, such as widget data area information 925 and widget data 926. The widget data area information 925 may include information indicating a range of a widget data area. Further, the widget data 926 may directly store data provided by the widget function or include information on a link through which a connection to the data provided by the widget function is made.

Figure 12:
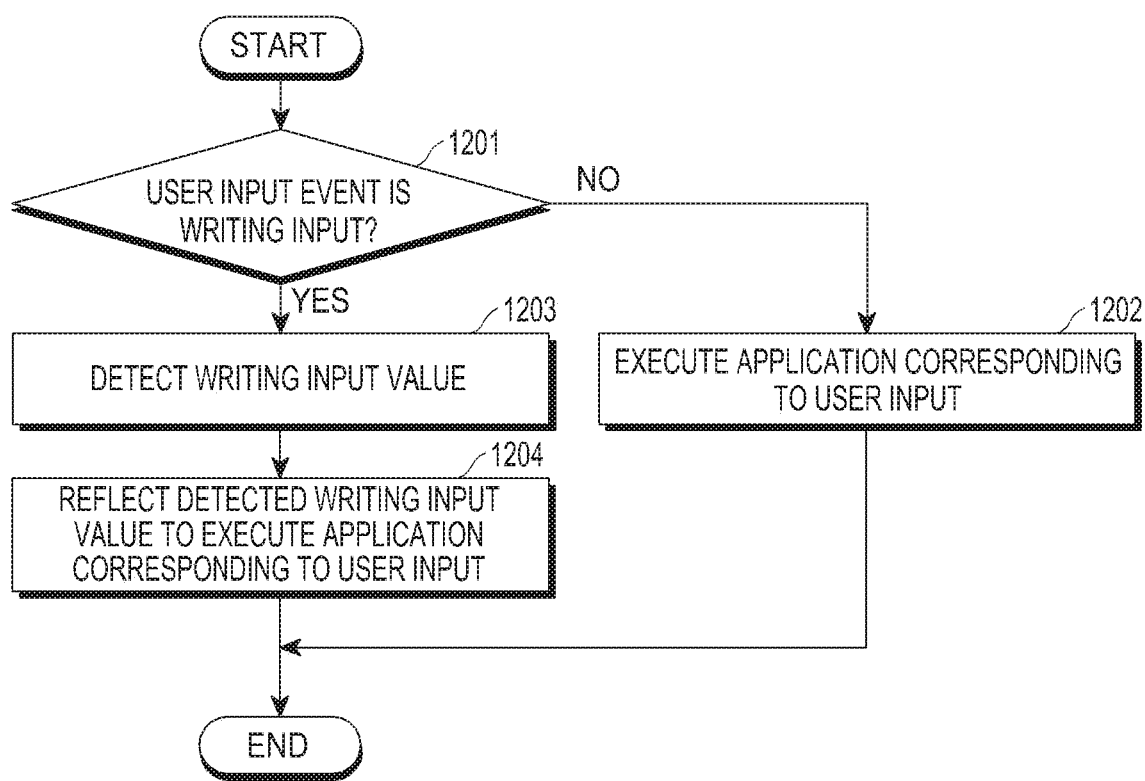
FIG. 12 is a flowchart illustrating another example of a process of executing an application by using a GUI provided to a GUI providing method according to an embodiment of the present disclosure.
Figure 13A:
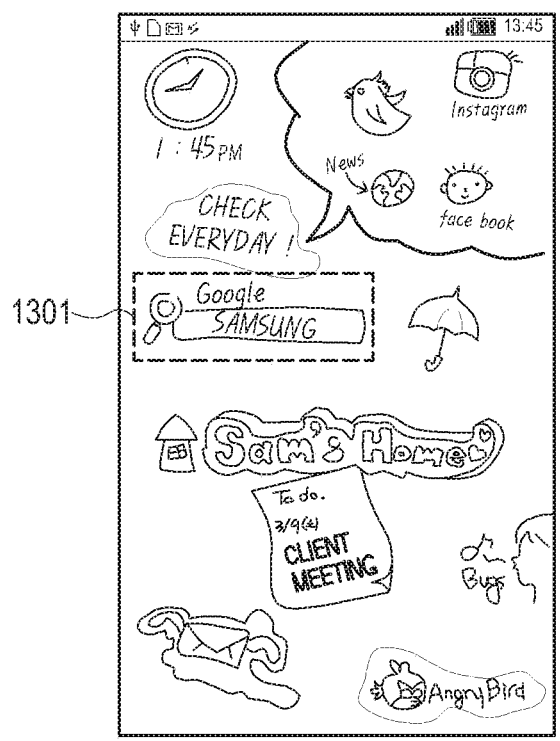
FIGS. 13A and 13B illustrate an example of an operation of executing an application using a writing input through a GUI provided to a GUI providing method according to an embodiment of the present disclosure.
Figure 13B:
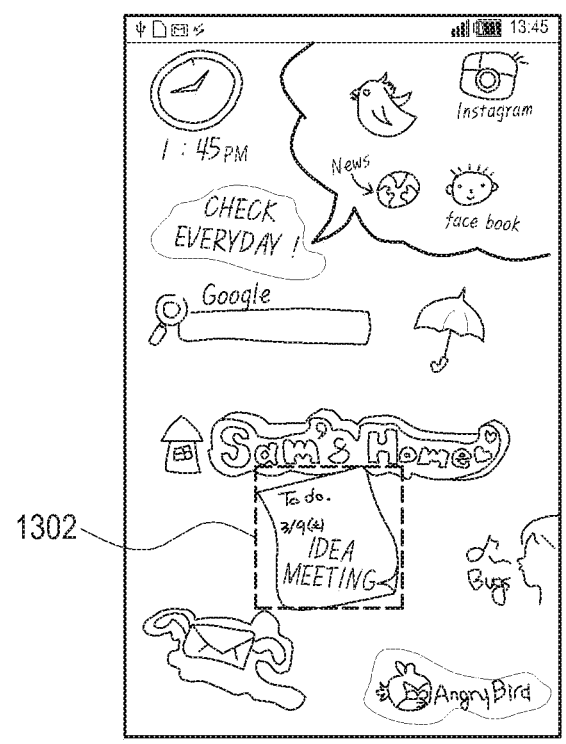

FIG. 12 is a flowchart illustrating another example of a process of executing an application by using a GUI provided to a GUI providing method according to an embodiment of the present disclosure. FIGS. 13A and 13B illustrate an example of an operation of executing an application using a writing input through a GUI provided to a GUI providing method according to an embodiment of the present disclosure.

Referring to FIGS. 2, 12, and 13A-13B, when a user input event occurs in operation 220, the controller 110 determines whether the user input event is a writing input in operation 1201. When the user input event is not the writing input in operation 1201, the controller 110 executes the application corresponding to an icon existing in the area determined in operation 220 in operation 1202.

When the user input event is the writing input in operation 1201, the controller 110 performs an operation of detecting a value of the writing input in operation 1203. The controller 110 preferentially loads the application corresponding to the icon existing in the area determined in operation 220, and reflects the value of the writing input to process an operation of the corresponding application in operation 1204.

For example, when the corresponding application is a "web searching application", the controller 110 may perform a web search having the value of the writing input as a keyword. When the corresponding application is a "contact number application 1301" (as shown in FIG. 13A), the controller 110 may perform a contact number search having the value of the writing input as a keyword. When the corresponding application is a "call application", the controller 110 may attempt a call with the contact number corresponding to the writing input value as the keyword. When the corresponding application is a "messaging application", the controller 110 may generate a messaging window configured to transmit a message to a corresponding user such that the message is transmitted to the contact number corresponding to the value of the writing input as the keyword. When the corresponding application is a "calendar application 1302" (as shown in FIG. 13B), the controller 110 may search for a schedule based on the writing input value as the keyword, or perform an operation of generating the schedule based on the writing input value as the keyword. When the corresponding application is a "watch application", the controller 110 may set the alarm for the time corresponding to the value of the writing input. When the corresponding application is a "music play application", the controller 110 may search for or reproduce music based on the writing input value as the keyword.

In another example, the controller 110 may perform an operation shown in Table 1 below based on the writing input value.

TABLE 1

| Application | Value of writing input | Corresponding processing operation |
| --- | --- | --- |
| Camera | V | Video photographing operation |
|  | C | Camera photographing operation |
| Watch | A | Alarm setting operation |
|  | S | Stopwatch operation |
|  | T | Timer operation |
| Music play | R | Random music play operation |
|  | S | Play end operation |

Although the embodiment of the present disclosure has described the operation of processing the corresponding application based on the writing input value, the present disclosure is not limited thereto and it is apparent that various modifications and applications can be made by to those skilled in the art.

Further, although the value of the writing input has been described as an example, it is apparent that various user gesture inputs can be used for the value of the writing input as an alternative. For example, in operation 1101, the controller 110 determines whether the user input event is a gesture input. When the user input event is the gesture input in operation 1101, the controller 110 performs an operation of detecting a value of the gesture input in operation 1103. The controller 110 preferentially loads the application corresponding to the icon existing in the area determined in operation 220, and reflects the value of the writing input to process an operation of the corresponding application to in operation S1104. For example, when the corresponding application is the "calendar application", the controller 110 may perform an operation of displaying a schedule set before or after the current time based on the gesture input. When the corresponding application is the "music play application", the controller 110 may reproduce music listed before or after the currently played music on the list.

It will be appreciated that the various embodiments of the present disclosure may be implemented in a form of hardware, software, or a combination of hardware and software. Any such software may be stored, for example, in a volatile or non-volatile storage device such as a ROM, a memory such as a RAM, a memory chip, a memory device, or a memory integrated circuit, or a recordable optical or magnetic medium such as a CD, a DVD, a magnetic disk, or a magnetic tape, regardless of its ability to be erased or its ability to be re-recorded. A web widget manufacturing method of the present disclosure can be realized by a computer or a portable terminal including a controller and a memory, and it can be seen that the memory corresponds to an example of the storage medium which is suitable for storing a program or programs including instructions by which the various embodiments of the present disclosure are realized, and is machine readable. Accordingly, the present disclosure includes a program for a code implementing the apparatus and method described in the appended claims of the specification and a machine (a computer or the like)-readable storage medium for storing the program.

Moreover, the above-described mobile terminal can receive the program from a program provision device which is connected thereto in a wired or wireless manner, and store the program.

A program providing apparatus may include a program including instructions to perform a preset contents protection method, a memory for storing information required for the contents protection method, a communication unit for performing wired or wireless communication, and a controller for controlling program transmission. When receiving a request for providing the program from a portable terminal, the program providing apparatus may provide the program to the portable terminal through a wire or wirelessly. Further, even when there is no request for providing the program from the portable terminal, for example, when the portable terminal is located within a particular place, the program providing apparatus may provide the program to the portable terminal through a wire or wirelessly.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
   displaying, on a touch screen of the electronic device, an image, including at least one object area, as a home screen, wherein each of the at least one object area is set as an icon corresponding to an application stored in the electronic device based on searching for an image of an object included in an area selected by a first user input from among icon images corresponding to applications stored in the electronic device;
   obtaining, via the touch screen, a second user input;
   identifying whether the second user input is a handwriting input;
   in response to identifying that the second user input is the handwriting input, identifying at least one text based on the handwriting input;
   identifying an application corresponding to an object area among the at least one object area where the second user input is input;
   identifying a function among a plurality of functions that can be executed by the application based on a keyword corresponding to the at least one text; and
   performing the function using the keyword.

2. The method of claim 1, further comprising:
   identifying the object area where the second user input is input; and
   performing the application corresponding to the object area.

3. The method of claim 1, further comprising:
   in response to identifying that the second user input is not the handwriting input, performing the application corresponding to the object area where the second user input is input.

4. The method of claim 1, wherein the function is identified among a plurality of functions of the application based on the at least one text.

5. The method of claim 1, wherein, when the application is a web search application, the function includes a web search function using the at least one text as a keyword.

6. The method of claim 1, wherein, when the application is a contact application, the function includes a contact search function using the at least one text as a keyword.

7. The method of claim 1, wherein, when the application is a voice call application or a message application, the function includes a voice call function or a message sending function to a contact corresponding to the at least one text.

8. The method of claim 1, wherein, when the application is a calendar application, the function includes a schedule search function or a schedule creation function using the at least one text as a keyword.

9. The method of claim 1, wherein, when the application is a clock application, the function includes an alarm function or a timer function using the at least one text.

10. The method of claim 1, wherein, when the application is a camera application, the function includes a camera function or a video recording function using the at least one text.

11. The method of claim 1, wherein, when the application is a music play application, the function includes a play function or a play end function using the at least one text.

12. An electronic device comprising:
    a touch screen; and
    at least one processor configured to:
       display, on the touch screen, an image, including at least one object area, as a home screen, wherein each of the at least one object area is set as an icon corresponding to an application stored in the electronic device based on searching for an image of an object included in an area selected by a first user input from among icon images corresponding to applications stored in the electronic device,
       obtain, via the touch screen, a second user input,
       identify whether the second user input is a handwriting input,
       in response to identifying that the second user input is the handwriting input, identify at least one text based on the handwriting input,
       identify an application corresponding to an object area among the at least one object area where the second user input is input,
       identify a function among a plurality of functions that can be executed by the application based on a keyword corresponding to the at least one text, and
       perform the function using the keyword.

13. The electronic device of claim 12, wherein the at least one processor is further configured to:
    identify the object area where the second user input is input, and
    perform the application corresponding to the object area where the second user input is input.

14. The electronic device of claim 12, wherein the at least one processor is further configured to perform the application corresponding to the object area where the second user input is input in response to identifying that the second user input is not the handwriting input.

15. The electronic device of claim 12, wherein the function is identified among a plurality of functions of the application based on the at least one text.

16. The method of claim 1, further comprising:
    setting each of the at least one object area as the icon corresponding to respective applications stored in the electronic device, based on the first user input.

17. The method of claim 16, further comprising:
displaying a user interface for setting each of the at least one object as the icon corresponding to the respective applications; and
receiving the first user input via the user interface.

\* \* \* \* \*